United States Patent
Sabry et al.

(10) Patent No.: US 6,233,223 B1
(45) Date of Patent: May 15, 2001

(54) CONTROL OF DISTRIBUTED ALLOCATION OF CHANNELS

(75) Inventors: Martin Sabry, Cambridge; Graeme A Gibbs, Saffron Walden; Rade Gvozdanovic, Harlow; Cho Y Tang, Loughton, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/368,278

(22) Filed: Aug. 3, 1999

(51) Int. Cl.$^7$ .................................................. G01R 31/08
(52) U.S. Cl. ................................. 370/230; 370/229
(58) Field of Search ................................. 370/230, 231, 370/232, 233, 235, 395, 396, 397, 399, 468

(56) References Cited

U.S. PATENT DOCUMENTS 5,784,358 * 7/1998 Smith ................................. 370/230
5,894,471 * 4/1999 Mivagi ................................. 370/230

OTHER PUBLICATIONS

Call Admission Control Schemes: A Review (Perros and Khaled) IEEE Communications Magazine Nov. 1996.

* cited by examiner

Primary Examiner—Douglas W. Olms
Assistant Examiner—Ricardo Pizarro
(74) Attorney, Agent, or Firm—Lee, Mann, Smith, McWilliams, Sweene & Ohlson (57) ABSTRACT

Admission control for a communications link involves maintaining a record at each end of the link of which channels on the link are free and allocating a free channel so that the probability of both ends allocating the same channel to different information flows is controllable. The record of channel identifiers is searched sequentially in different directions by the respective ends of the link to minimise the probability of simultaneous allocation before the records at each end are synchronised. New requests for admission to the link are allowed a different bandwidth threshold than requests for changes to existing connections already admitted to the link.

17 Claims, 9 Drawing Sheets

CONTROL OF DISTRIBUTED ALLOCATION OF CHANNELS

RELATED APPLICATIONS

This application relates to co-pending U.S. patent application Ser. No. 09/368,276 filed concurrently, titled "Derivation of Equivalent Bandwidth of an Information Flow", and incorporated herewith in its entirety.

FIELD OF THE INVENTION

The invention relates to apparatus for use at a near end of a link, for controlling admission of connections on a communications on a communication link, and to corresponding methods, and to software for carrying out such methods.

BACKGROUND TO THE INVENTION

Connection Admission Control is one of a number of known techniques for managing and controlling traffic and congestion in connection-orientated networks. In particular, it is used in ATM (Asynchronous Transfer Mode) networks to provide quality of services (QOS) guarantees. It is not limited to use in ATM networks.

Connection Admission Control (CAC) procedures are used to decide if a request for an ATM connection can be accepted, based on the network capacity and the attributes of both the requested connection and existing connections. It is important that there is always enough bandwidth so that quality of service guarantees for the existing connections and the requested connections, can be met.

CAC procedures may be used at an access node at the edge of an ATM network to enable control of access to the entire route through the ATM network as route selection is made. A second level, may be used at each node along the selected route through the ATM network, to confirm that a respective link beyond that node, can admit the connection. This is also called flow control, but for the present purposes, it is intended to be encompassed by the term admission control.

A useful summary of known admission techniques is contained in an article by Perros and Khaled in IEEE communications magazine November 1996, "Call Admission Control Schemes, a Review". Conventionally, when a CAC algorithm is used, for a link having numerous identified channels, one of these channels will be allocated to the information flow being admitted. As channels can be allocated from either end of the link, there is a risk of a channel being simultaneously allocated by both ends of different information flows. In this case, there is no mechanism to prevent or recover from this, and both information flows would be transmitted but neither would be received. Where the information flows are connections, they would both or either be dropped and the information would be lost.

This has been accepted up to now as the risk is usually very low, depending on the number of free channels, the mechanism for finding and allocating a free channel, and the delay (transmission delay and processing delay) in one side alerting the other side that a channel is no longer free.

However, if it desired to run a network at closer to maximum capacity, and as guarantees of quality of service become more important and more valuable, the inventors have regarded this risk of simultaneous allocation as a potential problem.

Another potential problem not addressed by conventional CAC schemes is where a change of speed, or change in some other characteristic of a connection, occurs after the connection has been admitted. There are many examples of this. In handling connections in the form of calls from the PSTN, a codec may assume a call to be voice and thus codable at a low bit rate, e.g. 8 kb/sec. Once set up and admitted to a network by a CAC algorithm, it turns out to be a fax or a modem call which needs the full 64 kb/sec. Thus, when in band DTMF (dual tone multiple frequency) tones are detected which may show it is not a voice call, the codec rate may change and thus one of the criteria used by the CAC alogorithm may change.

If the CAC algorithm showed the network to be close to the threshold for the maximum allowed bandwidth, it is possible that a change in an existing connection will exceed the threshold, and the change, despite having been admitted at first, will not be admitted by the CAC algorithm.

The connection would be dropped. This risk has been tolerated, but again, where it is desired to run a network close to maximum capacity, and as guarantees of quality of service become more important, the inventors have regarded this risk as a potential problem.

SUMMARY OF THE INVENTION

According to a first aspect of the invention there is provided apparatus for use at a near end of a link, for controlling admission of information flows to the link from the near end, the having a finite number of channels, at least some of which can be allocated by corresponding apparatus at a far end of the link, the near end apparatus comprising:

circuitry for maintaining a record at the near end, of which of the channels are free, circuitry for synchronising, a corresponding record at the far end apparatus with the near end record by propagating changes in the near end record to the far end record, and circuitry for allocating a free channel to one of the information flows such that a probability of the far end apparatus allocating the same channel before the far end record is synchronised, is controllable. By making the probability controllable, the risk of dropping a connection which would mean losing a call, can be managed. The risk can be set at a level which suits the environment and the commercial needs of the network operator.

PREFERRED FEATURES

Preferably, the probability is made controllable by controlling a proportion of the channels which can be allocated from both ends of the link Preferably the circuitry for allocating a free channels is arranged to search for a free channel from those channels which are not allocatable by the far end apparatus, before searching from those allocatable from both ends of the link. This enables the risk of simultaneous allocation to be reduced.

Preferably the record is maintained as a sequential list of channel identifiers, and the circuitry for allocating a free channel is arranged to search the list sequentially from one end for a free channel, such that the one end is the opposite end of the list to that used by the corresponding circuitry at the far end. This enables the risk of simultaneous allocated to be reduced still further, since each end is searching different parts of the list as far as possible.

Preferably the sequential search into the list is continued until either a free channel is found or a predetermined limit is reached. Setting such a limit is a convenient way of controlling the proportion of the channels which are allocatable from both ends.

Preferably the information flows comprises connections.

Preferably the link comprises an ATM virtual circuit.

Preferably the apparatus at the near end of the link further comprises circuitry for determining if a maximum allowed bandwidth for a group of the channels, would be exceeded, after the channel allocating circuitry has allocated a free channel.

Preferably the probability is made controllable by controlling a proportion of the channels allocatable from both ends, and by waiting a period of controllable duration after allocating a free channel, before using this channel. This allows the risk to be reduced further by reducing the period when one end has started using the channel yet the other end's record is unsynchronised. The wait period may be controlled so as not to exceed limits on PDD (post dialing delay)

OTHER ASPECTS OF THE INVENTION

Another aspect of the invention provides apparatus for controlling admission of connections on a communication link, the apparatus comprising:

circuitry, for receiving a request for admission of a new connection circuitry for receiving an indication of a change in traffic characteristics of an existing connection, and circuitry for determining whether an equivalent bandwidth used would exceed a maximum allowed bandwidth, wherein the maximum allowed bandwidth is determined according to whether a new connection is being requested or whether a change in traffic characteristics of an existing connection is indicated By treating changes differently from new requests, it is possible to reduce the risk of dropping an existing connection, without necessarily reducing the maximum allowable bandwidth for new connections, thus the bandwidth eficiency and quality of service can be independently maximised. This is particularly useful where there will be relatively few changes compared to new connection requests, and where maintaining existing connections is a high priority for good quality of service. Where the maximum allowed bandwidth is a statistical value, breaching this threshold temporarily is unlikely to cause problems. This is particularly so if other channels are likely to become free soon and so reduce the equivalent bandwidth in use back below the threshold for the maximum allowed bandwidth. In the meantime, no new connections will be admitted since the threshold for admitting new connections remains lower.

Preferably a predetermined maximum allowed bandwidth is used for the new connection request, and a predetermined margin is added to the maximum bandwidth for use in the case where a change is indicated in traffic characteristics.

Preferably the indication comprises an indication of voice band data. This is a common example of a change in traffic characteristics. It is important to recognise such a change and not to allow it to cause loss of the call.

Preferably the margin is at least sufficient to exceed the maximum allowed bandwidth by the difference in bandwidth between the smallest and greatest bandwidth of one channel. This would be sufficient margin to allow at least one change of any type of one channel.

Preferably the channels comprise channels of a virtual circuit of an ATM system.

Preferably the circuitry for determining whether an equivalent bandwidth used would exceed an allowed maximum allowed bandwidth is arranged to determine an equivalent bandwidth by determining a static approximation and a flow approximation for the equivalent bandwidth.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which.

DETAILED DESCRIPTION

Figure 1:
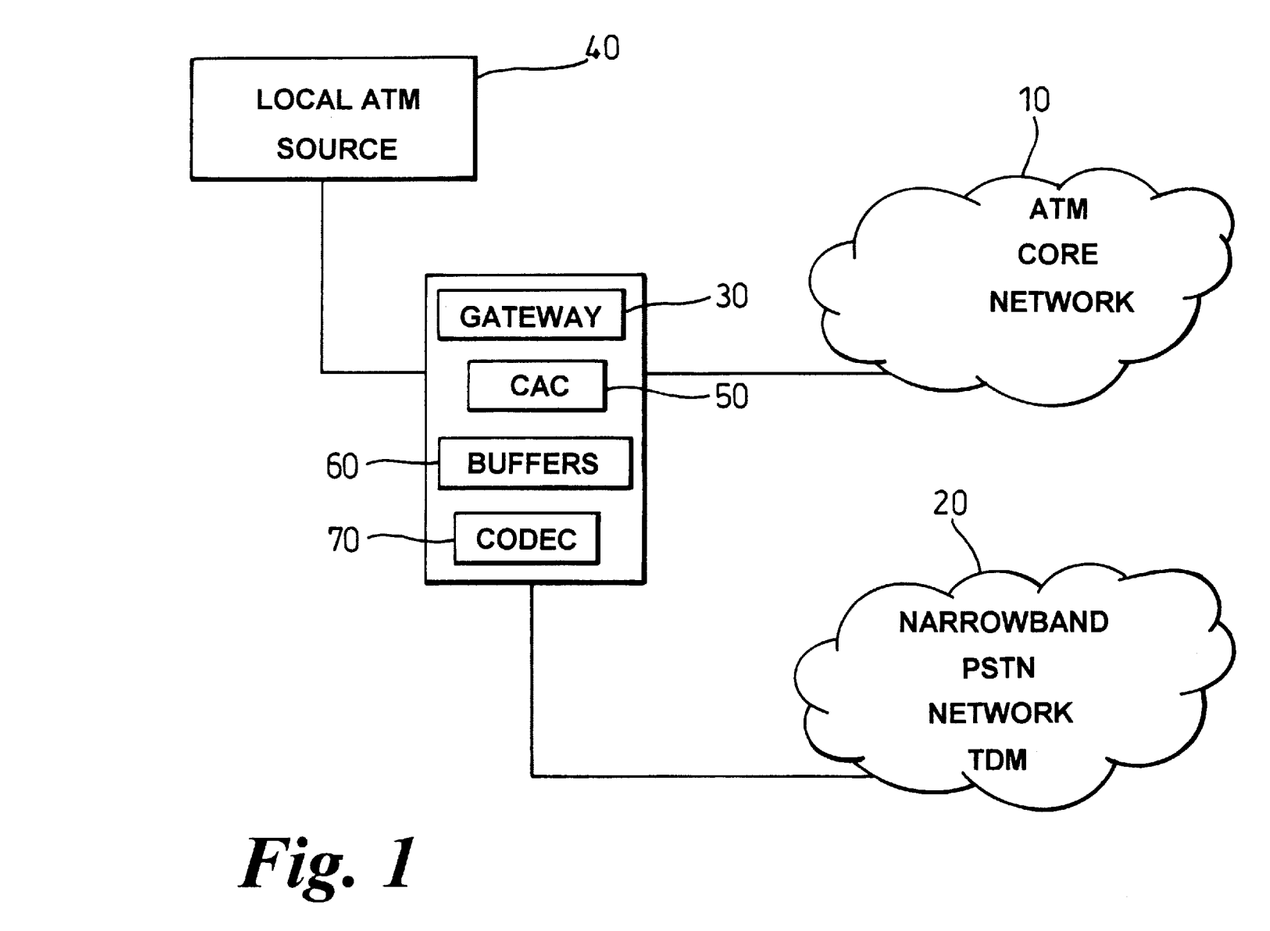
FIG. 1 illustrates a network environment in schematic form.

FIG. 1 shows in schematic form a network environment in which conection admission control may be used as will be described. An ATM core network 10 is connected to a narrow band PSTN (public service telephone network) 20 via a gateway 30. The gateway is also coupled to a local ATM source 40. The gateway includes a connection admission control function 50, typically implemented in software running on conventional processing hardware. The gateway also includes buffers 60 and Codec circuits 70 for converting between TDM (time division multiplex) signals from the PSTN network, and ATM cells. When a call is made from the PSTN network to any destination connected to the ATM core network, the gateway will receive a call admission request. The CAC function 50 will determine whether the link to a next node (not illustrated) in the ATM core network, has sufficient bandwidth to accept the call without affecting any quality of service contracts or guarantees which Ore in place either for the requested call, or for existing connections (which may be voice calls or data connections for example).

As illustrated, the ATM core network uses AAL2 ("A adaptation layer 2). Such networks are well known and need to be described further in detail here. The ATM link to the local ATM source 40 may also use AAL2. The connection admission control function 50 may also control admission of ATM connections on virtual channels requested by the local ATM source 40, for admission to the ATM core network. The gateway may have other functions and connections not directly related to CAC, and therefore not illustrated. For example, there may be separate connections to network management systems, to signalling networks such as an SS7 network associated with the PSTN.

Figure 2:
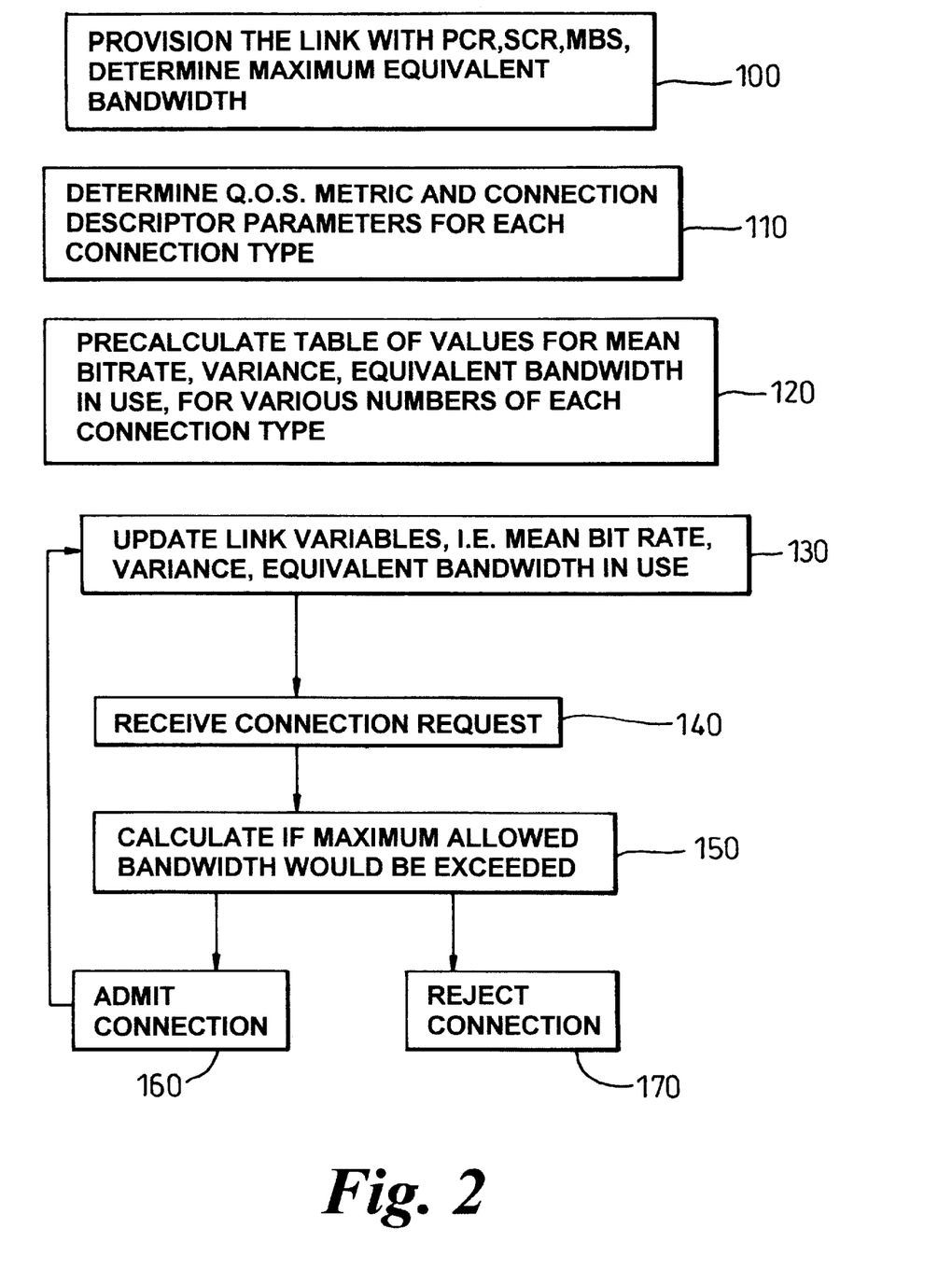
FIG. 2 shows in schematic form the operation of the gateway shown in FIG. 1.

FIG. 2—Operation of the Gateway

FIG. 2 shows in schematic form some of the principal functions of the gateway. How channel allocation, known as CID CAC (channel identifier CAC) fits into this scheme will be discussed below with reference to FIGS. 4 to 8. How change requests are handled within this scheme will be described with references to FIGS. 9 and 10.

Steps 100,110 and 120 are carried out during configuration of provisioning of the gateway. Other steps are carried out during opeation of the gateway.

At step 100, the gateway is provisioned with some of the variable describing the link with the ATM core network (and potentially for other links also). If the link is a CBR (constant bit rate) link, the the PCR (peak cell rate) is defined. If the link is a variable bit rate (VBR) link, the gateway needs to know its PCR, SCR (sustained cell rate) and MBS (maximum burst size). This can enable the maximum allowable bandwidth, known as equivalent cell rate ECR to be determined according to the definition of equivalency set out in Guerin at al. This value may be defined as a cell rate, or as a mean cell rate, or both. If both, then there are two thresholds to be met and the admission request would be rejected if either is not met.

At step 110, a quality of service (QOS), matrix and parameters of connections, for example, (connection descriptor parameters) must be agreed for each type of connection. This needs to be determined by the network operator. Typically the call descriptor parameters may include a peak rate $R^{peak}$·b (mean duration of active period (talk spurt), and p (fraction of time source active).

Connection types may include those defined by well known IT used standards G.729, G726, G711, which define codec parameters. There may be two types of connection for each codec standard, depending on whether silence suppression is on or off. At step 120, a table of values for mean bit rate, variance and equivalent band width in use is calculated for various numbers of each connection type. These may be incremental values in the sense of the additional equivalent bandwidth for one further connection, which for any given connection may be a different value depending on whether there are five existing connections or fifty existing connections. Accordingly, this look-up table contains values which represent a non-linear relationship between the equivalent bandwidth in use and the number f connections. More specifically, the table contains delta values suitable for adding to running totals referred to below as link variables. The delta values are non-linearly related to the number of connections, but the delta values may themselves be added in a linear fashion to the running totals.

The pre-calculated table may be a one-dimension look-up table accessible according to the number of connection types, or may be a two-dimensional table accessible by number of connections, and connection type. Other dimensions can be conceived to improve the accuracy. The number of dimensions, and the granularity of the table can be determined according to storage limitations, speed of access to the table, and required accuracy as desired.

At step 130 the link variables mentioned above, which are running totals of mean bit rate, variance, and equivalent bandwidth in use, are maintained, starting at zero when the network is initialised.

At step 140 a connection request is received. This may be either from another node in the ATM network, in which case the algorithm is being used for flow control, i.e. admission to the next link, within the ATM network. If the connection request is received from outside the ATM network, the algorithm is being used for controlling admission to the network.

At step 150 it is calculated whether the acceptance of the connection request would result in the maximum allowed bandwidth for the virtual circuit being exceeded. If no, at step 160 the connection is admitted, and the link variables are updated. If the maximum allowed bandwidth would be exceeded, the connection is rejected at step 170. Updating the link variables involves a straightforward summation of their running total and the delta values taken from the recalculated table.

Figure 3:
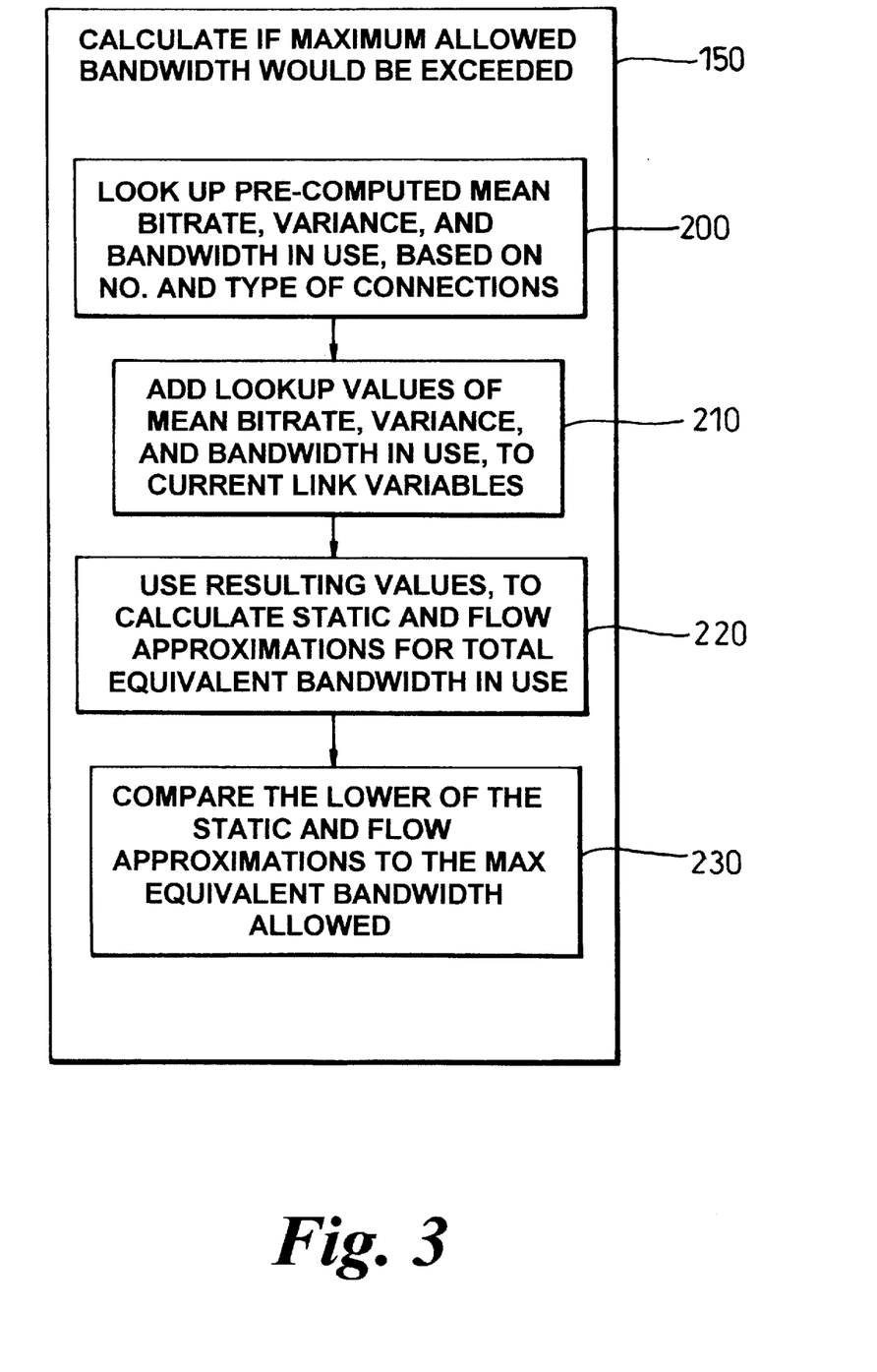
FIG. 3 shows the bandwidth calculation of FIG. 2 in more detail.

The calculation step 150 of whether the maximum allowed bandwidth would be exceeded is shown in more detail in FIG. 3.

FIG. 3, Bandwidth Calculation

FIG. 3 shows in more detail the steps involved in calculating if the maximum allowed bandwidth would be exceeded. At step 200, the look-up table is used for looking up pre-computer values for the mean bit rate, the variance, and the bandwidth to be used based on the number and type of connections. The above references paper by Guerin et al shows than an approximation, based on a combination of a fluid flow approximation and a stationary or static approximation gives results to an exact evaluation of equivalent capacity as defined by equation one.

$$\epsilon = \beta \cdot \exp\left(-\frac{K(c - \rho R_{peak})}{b(1-\rho)(R_{peak} - c)c}\right)$$

where $$\beta = \frac{(c - \rho R_{peak}) + \epsilon \rho(R_{peak} - c)}{(1-\rho)c}$$

$R_{peak}$=Peak rate e=Probability of overflow (i.e. CLR) c=Equivalent capacity K=Buffer size r=Fraction of time source active b=Mean duration of active period (talk spurt)

This equation is computationally extremely strenuous partly because it cannot be solved precisely and so numerical analysis or iterative methods must be used. Hence the approximation using the minimum of the fluid flow approximation and the stationary approximation as proposed by Guerin and shown in equation 2 is used.

$$C = \min\left\{\sum_{i=1}^{N} m_i + a'\sqrt{\sum_{i=1}^{N}\sigma_i^2}, \sum_{i=1}^{N} c_i\right\}$$

where $$a' = \sqrt{-2\ln(\varepsilon) - \ln(2\pi)}$$

$m_i$=Mean bit-rate of $i^{th}$ source $R_{peaki}$=Peak rate of $i^{th}$ source $\sigma_i^2$=Variance of $i^{th}$ source, $=m_i \times (R_{peaki}-m_i)$ $\epsilon$=Probability of overflow (i.e. CLR) $C_S$=the total equivalent bandwidth of N channels As can be seen, this equation is based on values of mean bit rate, variance and bandwidth used (otherwise termed equivalent capacity). At steps 210 and 220 of FIG. 3, these values are determined by adding the look-up values which represent the increment or delta beyond the current running totals of these values, to the existing running totals. The resulting values are used to calculate static and flow approximations and thus the resulting equivalent bandwidth to be in use if the requested connection is to be admitted.

At step 230, this result is compared to the maximum equivalent bandwidth allowed, to determine if this maximum allowed bandwidth be exceeded.

If so, the connection is rejected. This would normally cause the connection to be dropped if the algorithm is being used for admission to the ATM network. If the algorithm is being used for a link the ATM network, rejection of the admission request may result in a request for admission to a different link, to by pass the congested link.

Figure 4:
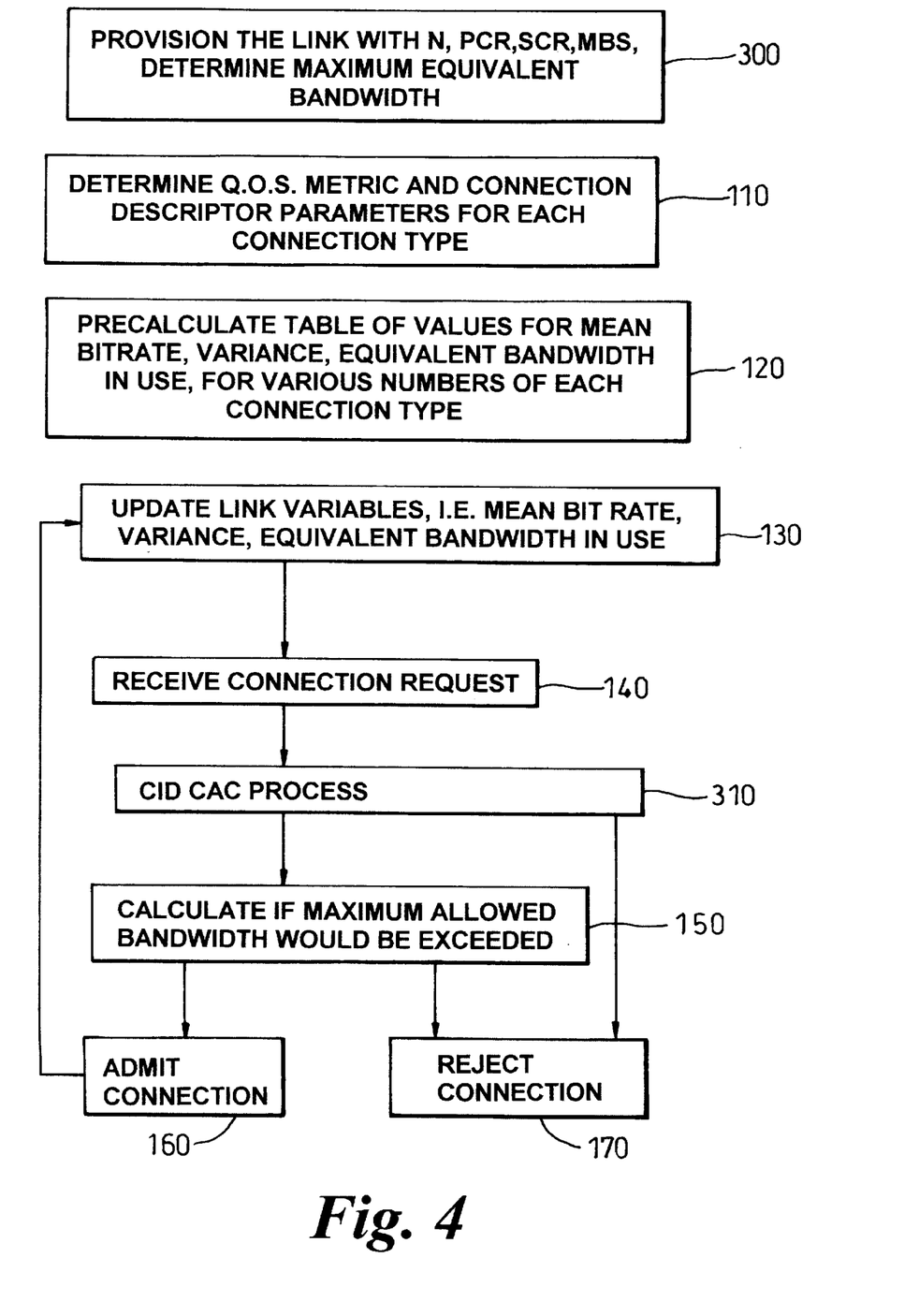
FIG. 4 shows in schematic form the operation as shown in FIG. 2 and also incorporating a CID CAC process.

FIG. 4 CID CAC

FIG. 4 shows the operation as set out in FIG. 2 and incorporating a channel allocation step in the CAC process. This involves a CID CAC process shown at step 310. Another difference over FIG. 2 is the provisioning step 300 in which a limit N which relates to the channel allocation process is provisioned.

The channel allocation process for an ATM example using a virtual circuit having multiple channels will now be described.

In addition to passing ATM address and VCCI (virtual circuit identifier) the terminating gateway chooses a free ML2 CID (channel identifier) and encapsulates this in the returning SDP (session description protocol), session descriptor to the originating gateway. The information "Remote GW (gateway ATM End System Address+VCCI+CID" is enough to allow an end-to end AAL2 connection to be established.

It is to be expected that both gateways may be required to select the AAL2 channels for different calls dependent on the direction from which these calls arrived. Therefore the possibility will arrive that gateways may be selecting the channel for 2 separate calls simultaneously. Unless means were taken to avoid this, channel "glare" could occur by which both gateways choose the identical channel each believing that the channel was currently free. This would only be resolved by the other end detecting the glare, and refusing the connection, causing the choosing end to choose again. This leads to additional messages and adds to post-dial delay.

So each end compares its ATM address with the remote end's ATM address. The higher address assigns CID values from the top down, the lower address from the bottom up (the opposite could be done but is needed to prevent glare when these "meet in the middle", a number of mechanisms may be employed:

a) an absolute limit to the number of concurrent channels with CIDs selected from that end, or b) an absolute limit to the number of concurrent channels in total.

These limits can be provisioned for PVCs (permanent virtual ciruit)/SPVCs (switched PVC) and selected from a profile for SVCs (switched virtual circuit)

Method a) If the sum of limits (n)<=the total number of channels (248 in one example as described below then glare should NEVER occur. However if connection creation is not symmetric i.e. one end receives more requests than the other, then a VCC can become unavailable for calls originating from one end even when the total number of active channels on the VCC as a whole is less than design limit (based on SCR (sustained cell rate)). If no overprovisioning of bandwidth is allowed in the network then the spare bandwidth available on that VCC is lost.

Method b) both gateways track the CIDs in use whoever originated them. CIDSs can be assigned if the total number is less than a provisioned threshold. Due to the delay in signalling from one gateway to another, if this provisioned value<124, then there exists a finite possibility of CID glare, but this latter mechanism allows the VCC to be filled up to its design capacity, which may be commercially extremely valuable.

The far end gateway much check each incoming create connection which specifies a CID against its own local database of CID usage. If a contention occurs, then 1 of 3 things has happened./ a) The local database is incorrect containing perhaps "old" information due to a lost DLCX.

b) The local database is correct, and the remote database was incorrect—cause unknown, which allowed the other gateway to re-assign a CID c) Classic CID glare for reasons as described above If the gateway assumed that glare was the case, then various things could be attempted:

a) The incoming connection could be refused.

b) The incoming connection could be refused AND the existing connection using that CID could be deleted by the gateway. Given that glare by nature of things occurs at both ends, this latter course allows the connection, which will be torn down anyway, to be torn down quicker.

c) One connection can be allowed to continue, and one connection refused/torn down. This could be based on ATM address of originating gateway. This has the advantage of allowing 1 call to complete. Method b) is preferred.

In FIG. 4, this CID process at the near end is followed either by rejecting the request at step 170 or if there is a free channel which has been allocated, by the calculation of whether the maximum allowed bandwidth would be exceeded at step 150, as described with references to FIGS. 2 and 3.

Figure 5:
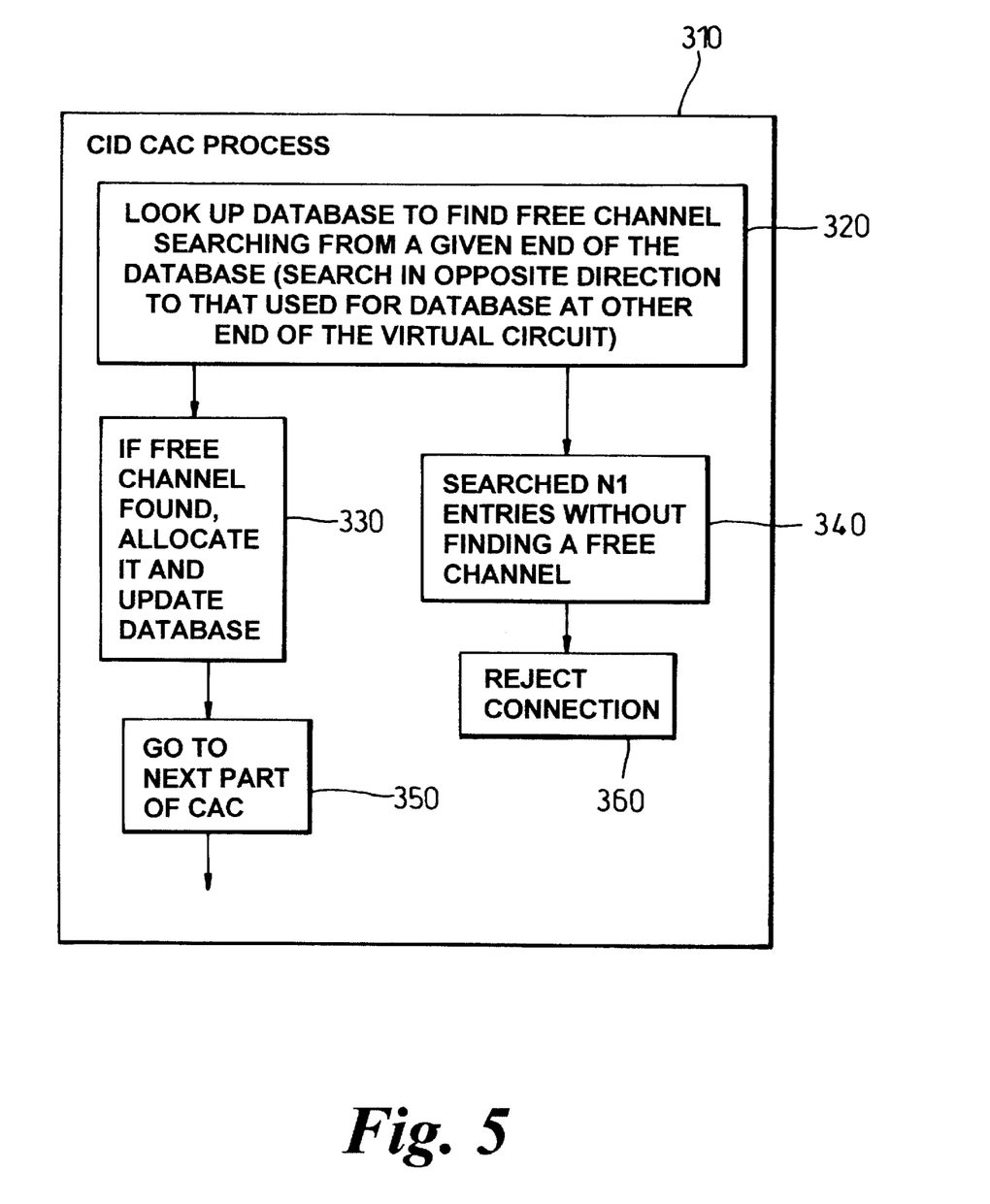
FIG. 5 shows in schematic form features of the CID CAC process.

FIG. 5 More Details of the CID CAC Process

FIG. 5 shows an expanded view of step 310 of FIG. 4. At step 320 the CID database containing the list of channel identifiers is searched to find a free channel. It is searched from a given end of the list. This search is carried out in the opposite direction to that used by the other end of the virtual circuit.

If a free channel is found, at step 330 the requested connection is allocated to this channel. The database is updated and a message is sent to update the database at the other end of the virtual circuit.

At step 350 the next part of the CAC process is carried out as shown in FIG. 4. At step 340, the search of the database continues up to a limit of N1 entries, if no free channels are found. N1 is provisioned earlier as indicated in FIG. 4. The limited N1 provides a way of limiting the overlap of the searches for free channels carried out at each end of the virtual circuit.

Figure 6:
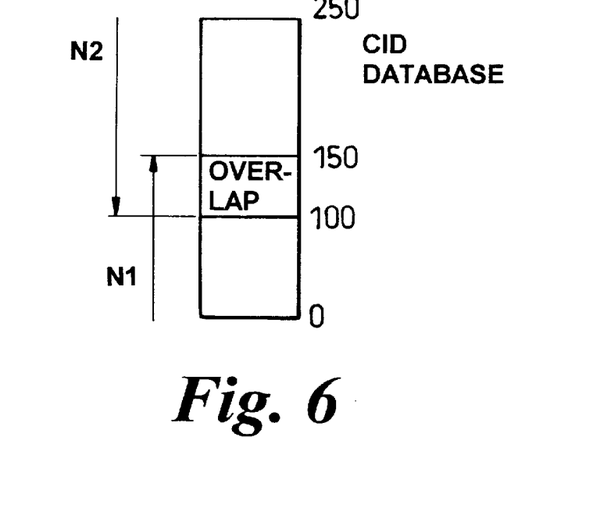
FIG. 6 shows in schematic form the CID database.

FIG. 6 shows an example of a CID database containing 248 entries. The database is searched in the direction shown by arrow N1 up to a limit of 150 entries. At the other end of the link the same database is searched from the top downwards as shown by arrow N2 down to the $100^{th}$ entry. As shown, the area of overlap is between the $100^{th}$ and the $150^{th}$ entry. The respective dimensions N1 and N2, and the amount of overlap may be determined according to how symmetric are the rates of connection request at each end. These dimensions can be chosen to provide a desired trade off between a risk of glare in the overlap area, and the desire to enable each end to make maximum use of the channels when there is less traffic at the other end. If a search by the near end algorithm reaches N1 entries without finding a free channel, the connection request is rejected as shown at step 360.

Figure 7:
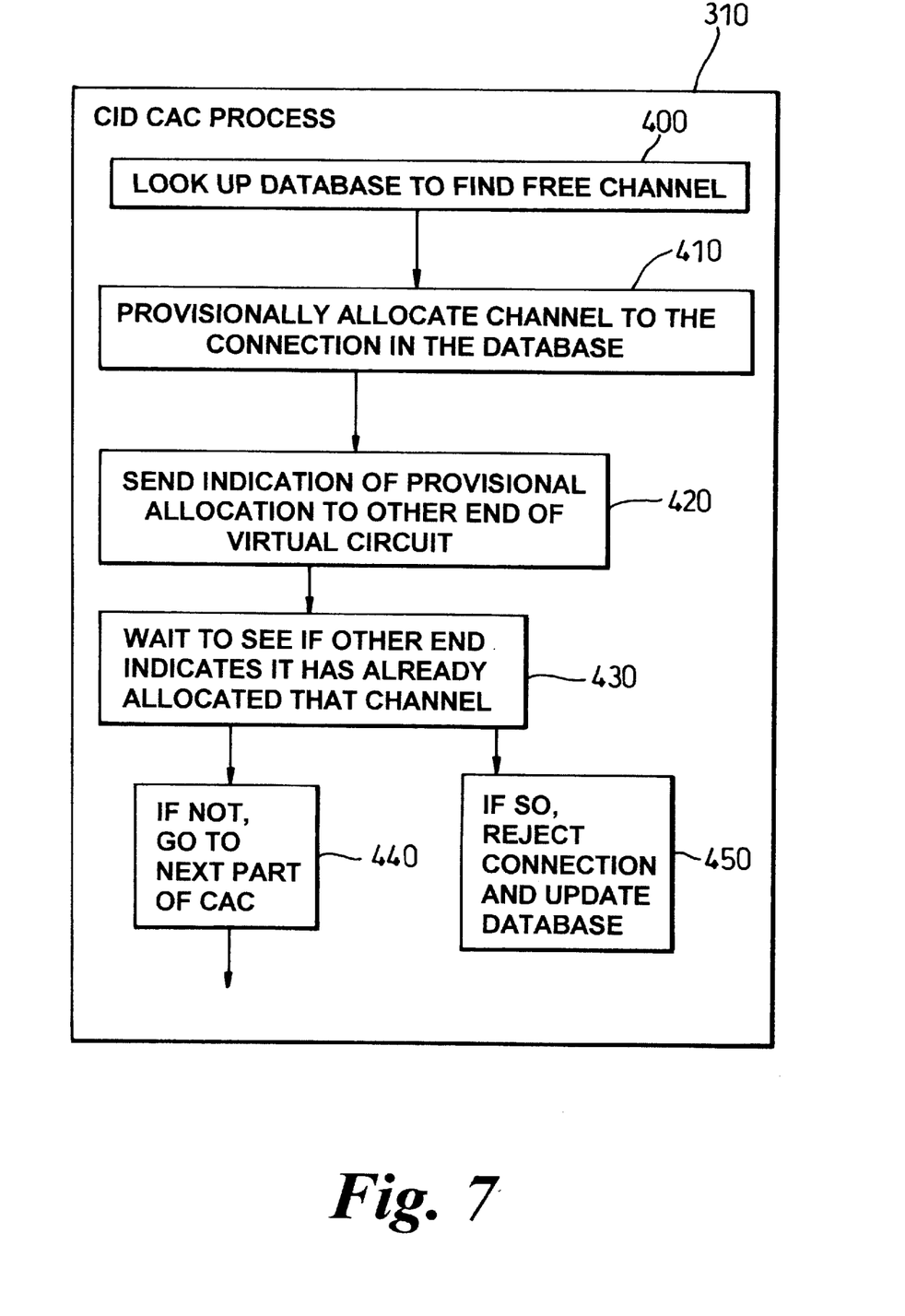
FIG. 7 shows alternative features of the CID CAC process.

FIG. 7, Alternative Featured of the CID CAC Process

An alternative, which may be combined with the features of FIG. 5, is shown in FIG. 7. This involves reducing the risk of glare by reducing the time in which conflict may occur, by introducing a delay before using a channel which has been provisionally allocated. At step 400 the database is searched to find a free channel. At step 410 a free channel is found and provisionally allocated in the database. An indication of this provisional allocation is sent to step 420 to the other end of the virtual circuit. At step 430 a delay is introduced for time T1 to see if the other end indicates it has already allocated that same channel. If not, at step 440 the next part of the CAC is carried out as shown in FIG. 4. If there is an indication that the other end has already allocated that channel, at 450 the connection is rejected and the database updated.

Figure 8:
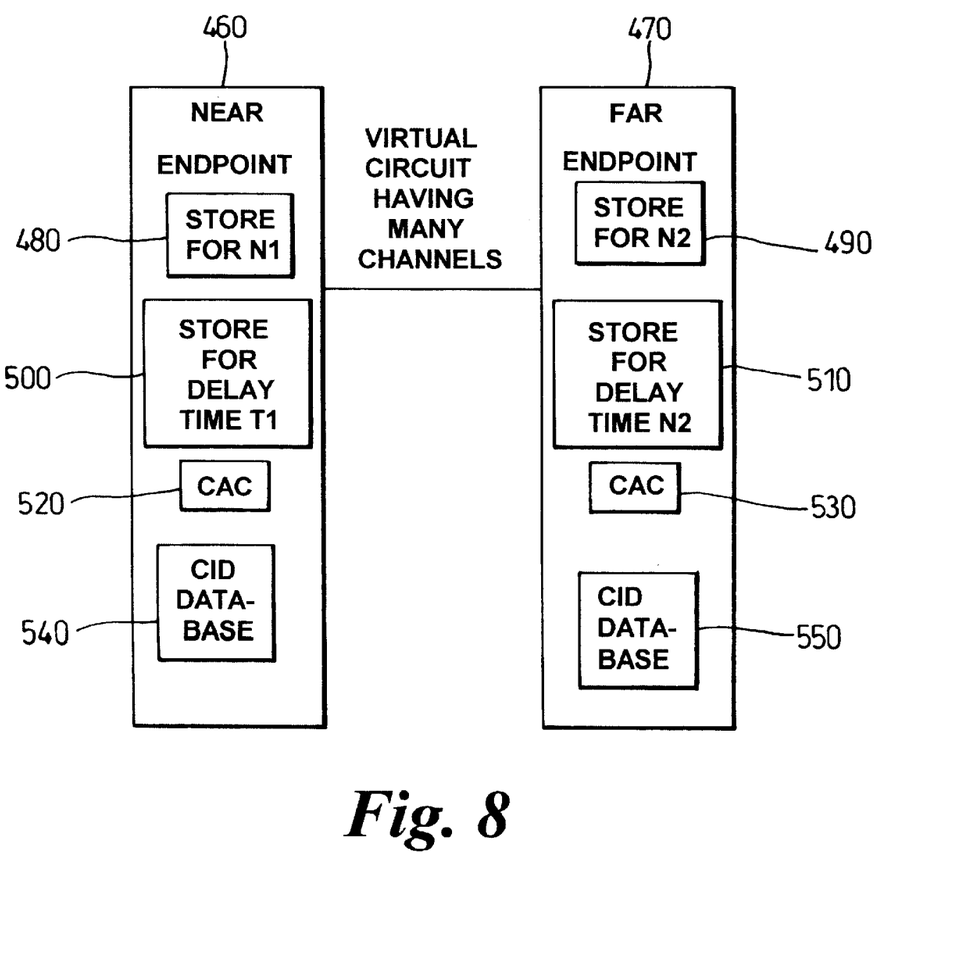
FIG. 8 shows near and far end points of a link which makes use of the channel allocation process.

FIG. 8 shows in schematic form some of the principal elements used in the channel allocation process described above. A near end point 460 is coupled by the link to a far end pint 470. The link includes a virtual circuit having many channels. At the near end point limit N1 is provisioned in a store 480 a delay time T1 may be provisioned in a store 500. A CAC processor 520 is shown for carrying out the algorithm. The near end CID database is shown as 540.

Far end point 470 includes a store for limit N2, 490, a store for delay T2, 510, a corresponding CAC processor 530, and the far CID database 550. Conventional hardware and software can be used for each of these elements, such as for example elements from the Passport range of products produced by Nortel Networks.

Figure 9:
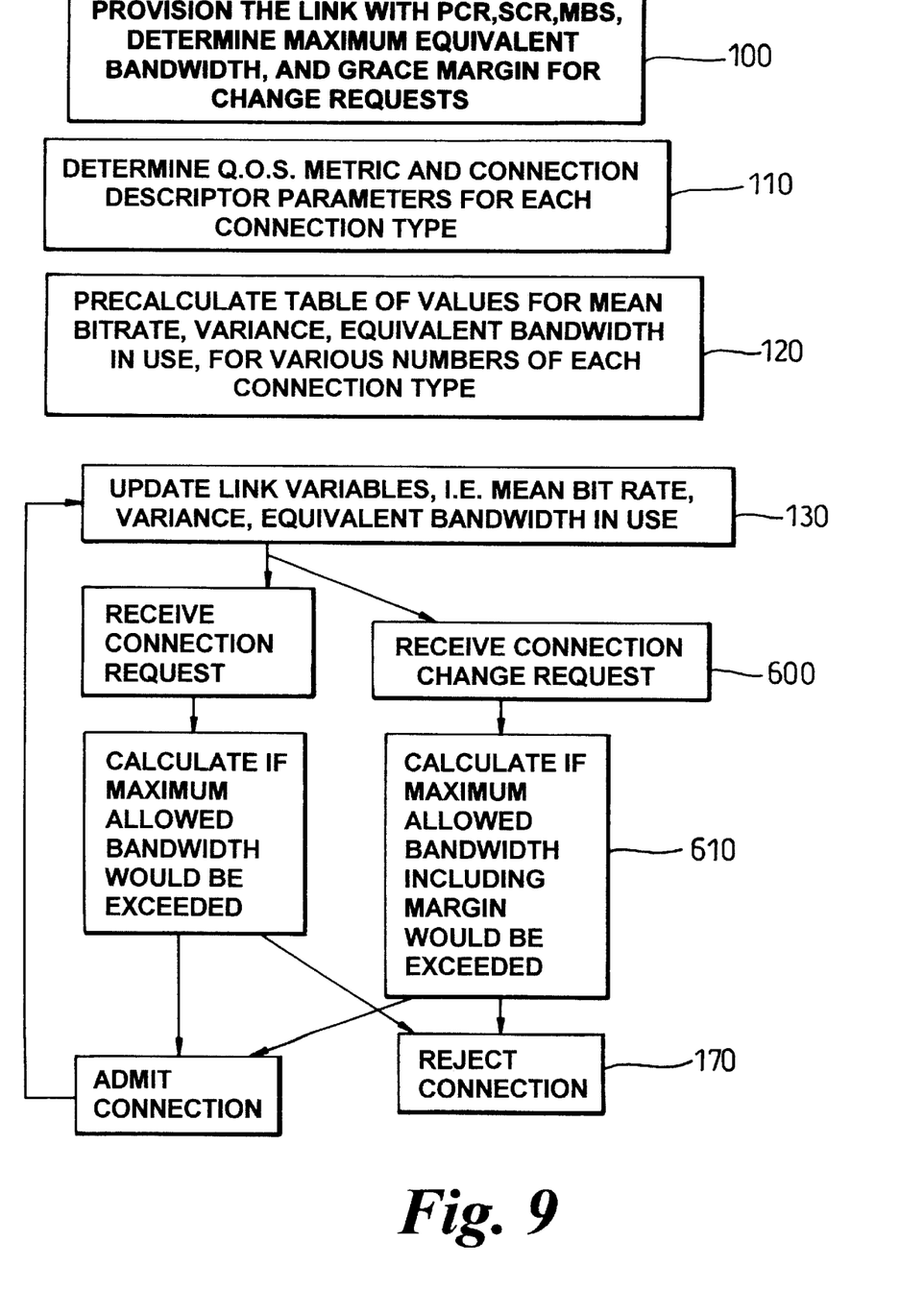
FIG. 9 shows the operation of FIG. 2 also incorporating connection change request features.
Figure 10:
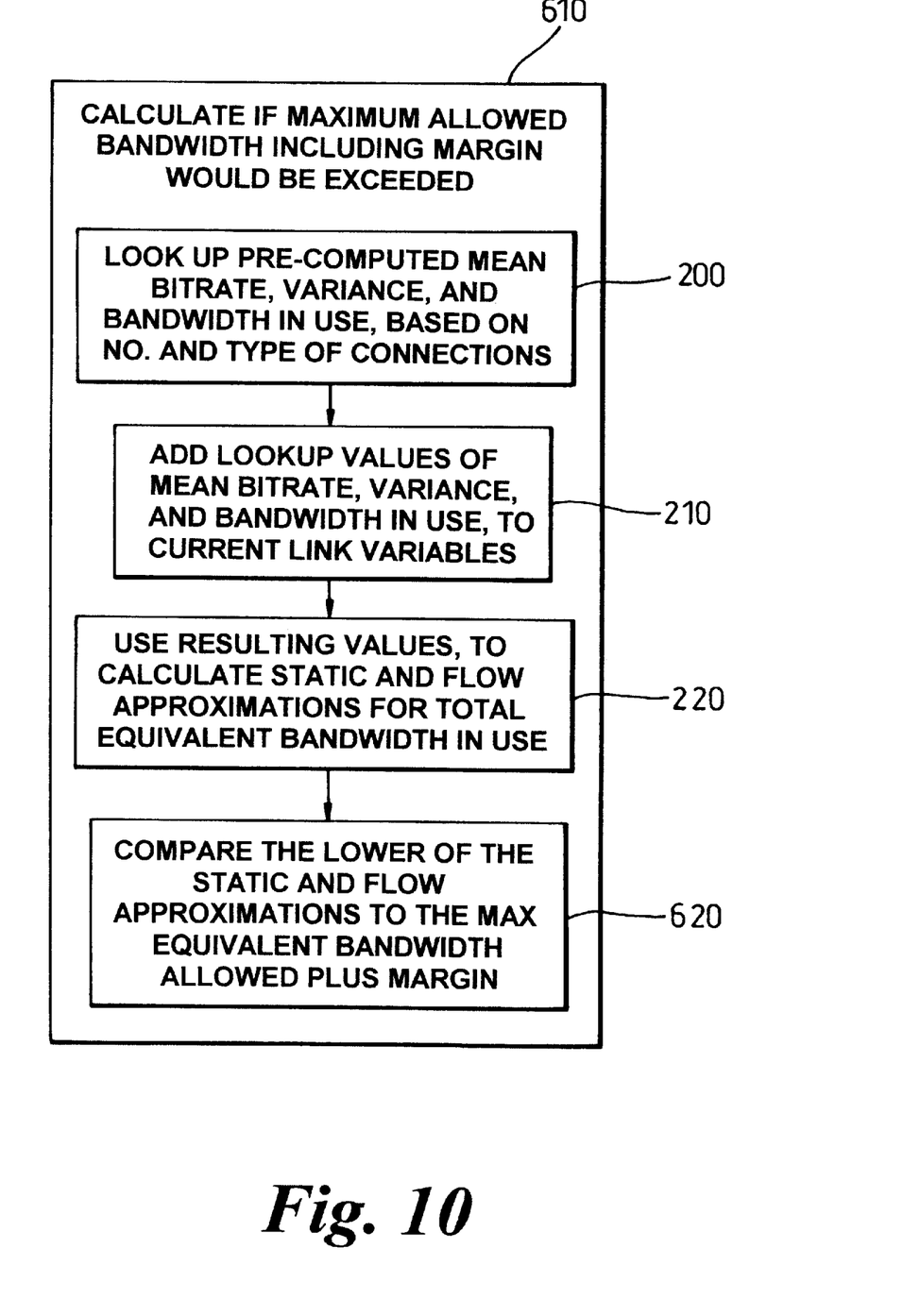
FIG. 10 shows some of the features of the bandwidth calculation for change requests of FIG. 9.

FIGS. 9 and 10 Handling Change Requests

FIG. 9 shows the operation as illustrated in FIG. 2 with the addition of steps 600 for receiving a connection change request, and calculating at step 610 if the maximum allowed bandwidth including an additional margin would be exceeded. The additional margin may be provisioned earlier as shown in step 700. The value of the margin may be chosen to ensure at least one change request will be accommodated. The value may depend on the types of connection being handled, the likelihood of change requests, and the bandwidth implications of such change requests. For example, to cater for voice band data, the bandwidth of a channel may change from 3.2 kb/sec for silence suppressed voice, up to 64 kb/sec for data such as fax or modem signals.

FIG. 10 shows calculation steps corresponding to those of FIG. 3 but comparing at step 620 the approximations with the maximum allowed equivalent bandwidth plus the margin.

OTHER EXAMPLES, VARIATIONS

Although the described examples use a sequential list in accessing the CID database, CIDs could be searched in any order, evan a random order, if they were tagged to indicate which are allocatable by one end, which are allocatable by both ends and so on.

Although the described examples use a predetermined look-up table, it is possible to make the CAC algorithm reactive, by updating or adjusting the table entries, by recalculating using measured values of parameters such as load, quality of service, and so on. Such a recalculation need not involve time-consuming iterative methods, since the equation is solvable directly, when some variables are replaced by measured values.

Other variations of the described embodiments, and other applications of the invention can be conceived and are intended to be within the scope of the claims.

What is claimed is:

1. Apparatus for use at a near end of a communications link, for controlling admission of information flows to the link from the near end, the link having a finite number of channels, at least some of which can be allocated by corresponding apparatus at a far end of the link, the near end apparatus comprising:

circuitry for maintaining a record at the near end, of which of the channels are free, circuitry for synchronising a corresponding record at the far end apparatus with the near end record by propagating changes in the near end record to the far end record, and circuitry for allocating a free channel to one of the information flows such that a probability of the far end apparatus allocating the same channel before the far end record is synchronised, is controllable.

2. The apparatus of claim 1 further comprising circuitry for controlling a proportion of the channels which can be allocated from both ends of the link, to make the probability controllable.

3. The apparatus of claim 1 wherein the circuitry for allocating a free channel is arranged to search for a free channel from those channels which are not allocatable by the far end apparatus, before searching from those allocatable from both ends of the link.

4. The apparatus of claim 1 wherein the record is maintained as a sequential list of channel identifiers, and the circuitry for allocating a free channel is arranged to conduct a sequential search of the list from one end for a free channel, such that the one end is the opposite end of the list to that used by corresponding circuitry at the far end.

5. The apparatus of claim 4 wherein the sequential search into the list is continued until either a free channel is found or a predetermined limit is reached.

6. The apparatus of claim 1 wherein the information flows comprise connections.

7. The apparatus of claim 1 wherein the link comprises an ATM virtual circuit.

8. The apparatus of claim 1 further comprises circuitry for determining if a maximum allowed bandwidth for a group of the channels would be exceeded, after the channel allocating circuitry has allocated a free channel.

9. The apparatus of claim 1 wherein the probability is made controllable by controlling a proportion of the channels allocatable from both ends, and by waiting for a period of controllable duration after allocating a free channel, before using this channel.

10. A method of using apparatus at a near end of a communications link, for controlling admission of information flows to the link from the near end, the link having a finite number of channels, at least some of which can be allocated by corresponding apparatus at a far end of the link, the method comprising the steps of:

maintaining a record at the near end, of which of the channels are free synchronising a corresponding record at the far end apparatus with the near end record by propagating changes in the near end record to the far end record, and allocating a free channel to one of the information flows such that a probability of the far end apparatus allocating the same channel before the far end record is synchronised, is controllable.

11. Apparatus for controlling admission of connections on a communication link, the apparatus comprising:

circuitry, for receiving a request for admission of a new connection circuitry for receiving an indication of a change in traffic characteristics of an existing connection, and circuitry for determining whether an equivalent bandwidth used by all the connections currently admitted and currently requesting admission to the communication link, would exceed a maximum allowed bandwidth of the communication link, wherein the maximum allowed bandwidth is determined according to whether a new connection is being requested or whether a change in traffic characteristics of an existing connection is indicated.

12. The apparatus of claim 11 wherein a predetermined maximum allowed bandwidth is used for the new connection request, and a predetermined margin is added to the maximum bandwidth for use in the case where a change is indicated in traffic characteristics.

13. The apparatus of claim 11 wherein the indication comprises an indication of voice band data.

14. The apparatus of claim 12 wherein the predetermined margin is at least sufficient to exceed the maximum allowed bandwidth by the difference in bandwidth between the smallest and greatest bandwidth of one channel.

15. The apparatus of claim 11 wherein the maximum allowed bandwidth is determined for a virtual circuit of an ATM system.

16. The apparatus of claim 11 wherein the circuitry for determining whether an equivalent bandwidth used would exceed an allowed maximum allowed bandwidth is arranged to determine an equivalent bandwidth by determining a static approximation and a flow approximation for the equivalent bandwidth.

17. A method of controlling admission of connections on a communication link, comprising the steps of:

making a request for admission of a new connection receiving an indication of a change in traffic characteristics of an existing connection, and determining whether an equivalent bandwidth used by all the connections currently admitted and currently requesting admission to the communication link, would exceed a maximum allowed bandwidth of the communication link, wherein the maximum allowed bandwidth is determined according to whether a new connection is being requested or whether a change in traffic characteristics of an existing connection is indicated.

* * * * *